United States Patent [19]
Cornec

[11] Patent Number: 5,841,646
[45] Date of Patent: Nov. 24, 1998

[54] RESONANCE INVERTER POWER SUPPLY CONTROL DEVICE INCLUDING TRANSISTOR SWITCH-OVER DECISION SIGNALS

[75] Inventor: René Cornec, La Chapelle St Mesmin, France

[73] Assignee: Cepem, St Jean de la Ruelle, France

[21] Appl. No.: 790,996

[22] Filed: Jan. 30, 1997

[30] Foreign Application Priority Data

Jan. 30, 1996 [FR] France ................................. 96 01059

[51] Int. Cl.⁶ ................................................. H02H 7/122
[52] U.S. Cl. ............................. 363/56; 363/98; 363/132; 219/665
[58] Field of Search ................................. 363/56, 41, 98, 363/80, 132, 58; 219/661, 664, 665

[56] References Cited

U.S. PATENT DOCUMENTS

| | | | |
|---|---|---|---|
| 4,342,076 | 7/1982 | Rosswurm et al. | 363/56 |
| 4,739,465 | 4/1988 | Asano et al. | 363/56 |
| 5,027,263 | 6/1991 | Harada et al. | 363/16 |
| 5,093,771 | 3/1992 | Harvest | 363/98 |

FOREIGN PATENT DOCUMENTS

| | | |
|---|---|---|
| 0 320 410 | 6/1989 | European Pat. Off. . |
| 2 644 948 | 9/1990 | France . |

Primary Examiner—Shawn Riley
Attorney, Agent, or Firm—Oblon, Spivak, McClelland, Maier & Neustadt, P.C.

[57] ABSTRACT

In a device for the control of a circuit comprising a resonance inverter power supply for at least one load comprising an inductive component, the inverter power supply comprises at least two switches ($Q_1$, $Q_2$) mounted between the terminals of a DC voltage supply. The device has a current transformer (TR) comprising a primary winding (TRp) series-connected between the load and the common junction point between the switches ($Q_1$, $Q_2$), the freewheeling rectifiers ($D_1$, $D_2$) and the snubber capacitors ($C_1$, $C_2$); a first secondary winding ($TR_{S1}$) connected between the emitter of one ($Q_1$) of the two switches and the first terminal of a first DC supply ($E_1$), the second supply terminal being connected to the base of the switch ($Q_1$); a second secondary winding ($TR_{S2}$) connected between the emitter of the other switch ($Q_2$) and the first terminal of a second DC supply ($E_2$), the second supply terminal being connected to the base of this other switch ($Q_2$); a third secondary winding ($TR_{S3}$) and a fourth secondary winding ($TR_{S4}$) coupled respectively to the second and first secondary windings, the third and fourth secondary windings ($TR_{S3}$, $TR_{S4}$) being each connected between a ground and one of the power interfaces. The biases of the different windings are chosen in such a way that the opening of a switch takes place as soon as the associated switch-over decision signal is in a state representing the decision to open, and in such a way that the closing of a switch takes place when the associated switch-over decision signal is in a state representing the decision to close, and substantially when the current in the load has changed direction. Application to induction cooking devices.

4 Claims, 5 Drawing Sheets

RESONANCE INVERTER POWER SUPPLY CONTROL DEVICE INCLUDING TRANSISTOR SWITCH-OVER DECISION SIGNALS

BACKGROUND OF THE INVENTION

An object of the invention is a device for the control of a circuit comprising a resonance inverter power supply for at least one load comprising an inductive component.

Circuits of this kind are also known as ZVS or zero voltage switch structures.

They can be used especially in induction cooking hobs where the load is constituted by the association of an inductor and a cooking utensil placed above the inductor.

Any ZVS structure can be reduced to the electrical diagram of FIG. 1.

More specifically, the circuit pertaining to the framework of the present invention is an inverter power supply of the type comprising at least two transistor (bipolar, MOSFET or IGBT) type switches $Q_1$, $Q_2$ series-connected to the terminals of a DC voltage supply $-E$, $+E$. The switching transistors $Q_1$ and $Q_2$ are controlled at a predetermined frequency so as to be alternately conductive. They transmit the energy of the supply voltage to a load Z through a resonance inductor L and a resonance capacitor C series-connected to the junction point J of the two switches. To enable the operation of a structure of this kind, two freewheeling rectifiers $D_1$ and $D_2$, each parallel-connected to one of the two transistors, are necessary. These rectifiers temporarily take charge of the current during the idle time when the two switches are open. As can be seen in FIG. 1, the junction point of the two freewheeling rectifiers $D_1$ and $D_2$ is common with that of the switches $Q_1$ and $Q_2$. Besides, to reduce switching losses as efficiently as possible, a snubber capacitor $C_1$, $C_2$ is parallel-connected to each switch.

FIG. 2 shows a timing diagram of operations of the half-bridge ZVS structure of FIG. 1.

More specifically, the curve in the upper part of FIG. 1 shows the shape of the current $I_L$ in the load in the course of time. In the lower part of FIG. 2, the curve $I_1$ shown in dashes represents the current in the switch $Q_1$ in the course of time and the curve $U_1$ in a solid line shows the voltage at the terminals of the switch $Q_1$ in the course of time. There are four stages of operation referenced (1) to (4) on the X-axis which represent time.

(1) The switch $Q_1$ is conductive until the time of its opening. In this stage, the current $I_1$ and the current $I_L$ increase. When the switch $Q_1$ is closed, the current $I_1$ gets cancelled out.

(2) The current $I_L$ discharges the capacitors $C_1$ and $C_2$ up to the conduction of the freewheeling rectifier $D_2$. The voltage $U_1$ at the terminals of the switch $Q_1$ increases up to the value 2E.

(3) The freewheeling rectifier $D_2$ is conductive.

(4) The switch $Q_2$ is conductive. The current $I_L$ has become negative.

Because of the capacitors $C_1$ and $C_2$, the increase in the voltage of the terminals of $Q_1$ takes place far more slowly than the decrease in the current $I_1$. This explains why the switching losses are far smaller with these two capacitors.

In order that the above assembly may work properly, it is noted that as the time of closure of the switches $Q_1$ or $Q_2$ must be carefully chosen. It must be seen to it in particular that the capacitors $C_1$ and $C_2$ have been accurately charged or discharged before a switch is closed.

Two control strategies have been chosen at the present time.

A first control strategy, known as the dual thyristor strategy, consists in enabling the closure of the switch only when the voltage at its terminals gets cancelled out. A strategy of this kind is described for example in the document FR 2 499 789. The major drawback of this type of strategy lies in the fact that if, for reasons of variations in load or in input voltage or problems related to starting up, the current $I_L$ in the load is not sufficient to charge or discharge the capacitors $C_1$ and $C_2$, then the voltage of the terminals of the switches does not get cancelled out and the switches are not closed. Furthermore, in the event of a wrong command, for example when it is decided to open a switch too early, the current will not be sufficient to make the freewheeling rectifier conductive and the other switch, whose voltage never gets cancelled out, cannot be closed.

A second control strategy, called an idle time strategy, consists in enabling the closure of a switch only for a fixed and predetermined period $T_M$ after the other switch has been opened. If, for reasons identical to those mentioned here above, the current $I_L$ is not sufficient for the charging or discharging of the snubber capacitors, the switches will be closed with a residual voltage at the terminals of the capacitors. There follows an overvoltage in the switches that is detrimental to their operation, and may even cause their destruction. Furthermore, a control strategy of this kind is ill-suited to the use of bipolar transistors and switches. Indeed, the bipolar transistors have a certain response time, called a storage time, that is difficult to control and may be in the range of twice the duration $T_M$. It is of course possible to remedy this by requiring that the instant from which the period $T_M$ runs is no longer the instant of opening of a transistor but the instant when the current in the transistor gets cancelled out. However it is then necessary to provide for special circuits.

The present invention is aimed at proposing a new control strategy that does not have the above-mentioned drawbacks.

SUMMARY OF THE INVENTION

The control strategy used by the invention enables an operation of the inverter power supply so that:

the decision to open a switch is immediately put into effect, the decision to close a switch is put into effect only when the current in the load gets cancelled out and changes its direction.

More specifically, an object of the present invention is a device for the control of a circuit comprising a resonance inverter power supply for at least one load comprising an inductive component, the inverter power supply being of the type comprising at least one pair of switching transistors series-connected between the terminals of a DC voltage supply so as to form two switches that are alternately conductive under the effect of the control device, two freewheeling rectifiers each parallel-connected to one of the two transistors, two snubber capacitors each parallel-connected to one of the two transistors, the common junction point between the two switching transistors, the freewheeling rectifiers and the capacitors being series-connected to a terminal of said load, the device comprising:

first means delivering, for each switch, a two-state switch-over decision signal representing a decision to open or to close the switch, the two switch-over decision signals being each associated, by means of a power interface, with the two switches, the two switch-over decision signals being in phase opposition in such as way as to decide the periodic opening and closing of each switch alternately, second means used for the detection of the changes of direction of the current in the load, wherein the device comprises a current transformer comprising:

a primary winding series-connected between the load and the common junction point between the switches, the freewheeling rectifiers and the snubber capacitors;

a first secondary winding connected between the emitter of one of the two switches and the first terminal of a first DC supply, the second supply terminal being connected to the base of the switch;

a second secondary winding connected between the emitter of the other switch and the first terminal of a second DC supply, the second supply terminal being connected to the base of this other switch;

a third secondary winding and a fourth secondary winding coupled respectively to the second and first secondary windings, the third and fourth secondary windings being each connected between a ground and one of the power interfaces;

the biases of the different windings being chosen in such a way that the opening of a switch takes place as soon as the associated switch-over decision signal is in a state representing the decision to open, and in such a way that the closing of a switch takes place when the associated switch-over decision signal is in a state representing the decision to close, and substantially when the current in the load has changed direction.

BRIEF DESCRIPTION OF THE DRAWINGS

The invention as well as the advantages that it provides shall be understood more clearly from the following description, made with reference to the appended drawings, of which.

DESCRIPTION OF THE PREFERRED EMBODIMENTS

Figure 3:
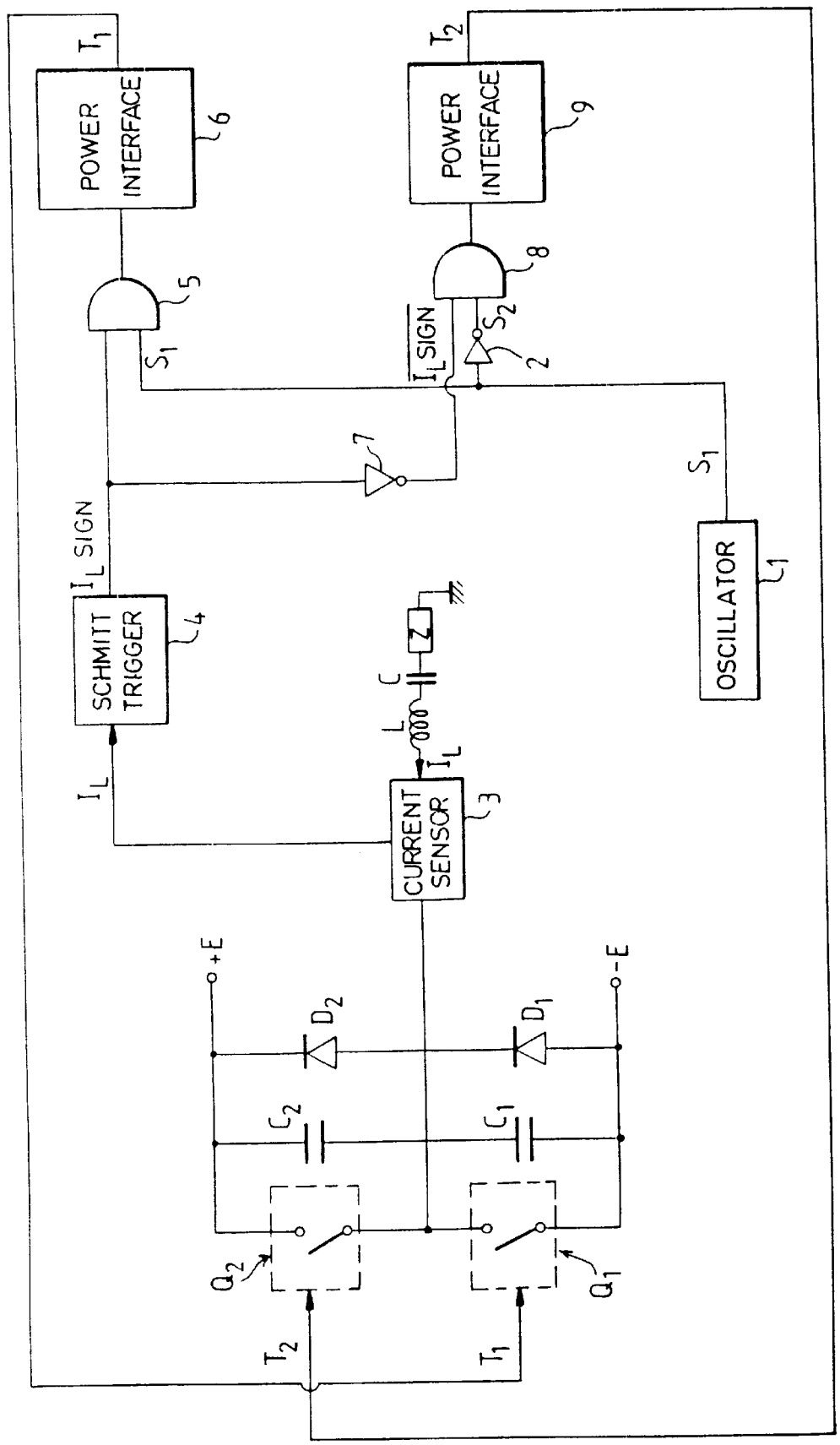
FIG. 3 illustrates a possible embodiment of a device for the implementation of the control strategy used by the invention.
Figure 4:
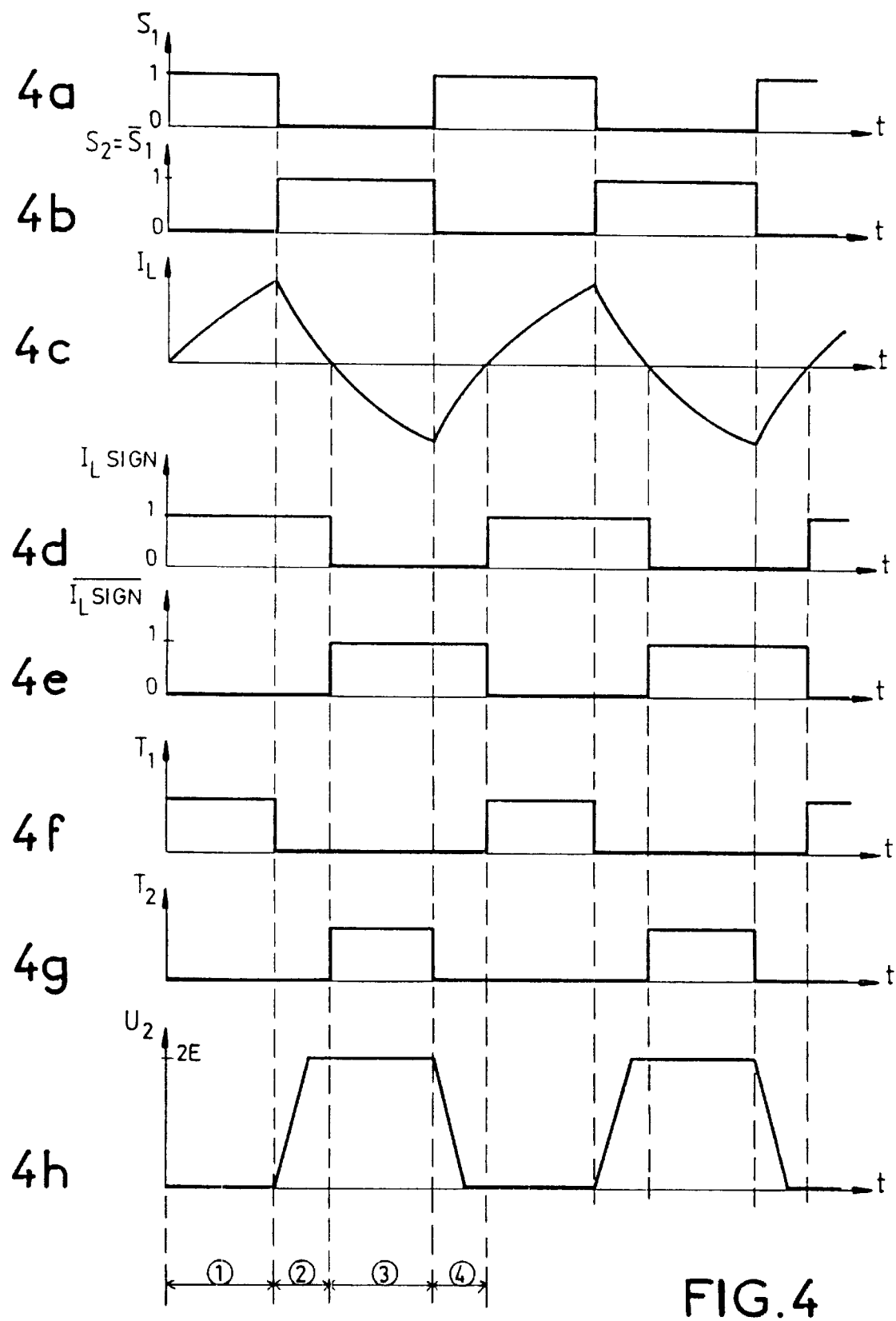
FIG. 4a –h gives an illustration, in the form of a timing diagram, of the working of the control for the device of FIG. 3.

FIG. 3 shows a possible embodiment of a control device for the implementation of the control strategy according to the invention. FIG. 3 shows the half-bridge ZVS structure of FIG. 1. All the other elements of the figure are proper to the control device of this structure. To understand the operation, reference shall be made to the different curves of FIG. 4, representing the shape of the signals in the course of time at different points of the control device and of the ZVS structure. Two switch-over decision signals $S_1$ and $S_2$ are created for the opening and closing of each of the switches $Q_1$, $Q_2$. The curves 4a and 4b of FIG. 4 illustrate the shape of these two decision signals in time. Each signal $S_1$ or $S_2$ has two states 1 or 0 representing a decision to open or close the associated switch. In the example shown, the signal $S_1$ goes from the state 1 to the state 0 when it is decided to open the switch $Q_1$ and goes from the state 0 to the state 1 when it is decided to close it. The signals $S_1$ and $S_2$ are periodic and in phase opposition ($S_2=\overline{S_1}$) in such a way as to decide on the periodic and alternating opening and closure of the two switches $Q_1$ and $Q_2$. one of the two decision signals, for example $S_1$, can be obtained from an oscillator 1 (FIG. 3) generating a square-wave signal, and the signal $S_2$ can be obtained by means of an inverter gate 2 receiving the signal $S_1$ at its input.

Furthermore, the curve 4c of FIG. 4 illustrates the shape of the current $I_L$ in the load. A current sensor 3, series-connected to the load, is used for the current $I_L$ to be picked up. The comparison of this current picked up with a fixed reference equal to or slightly greater than zero gives a logic signal $I_L$-SIGN with two states, representing the direction of the current $I_L$ in the load. The curve 4d of FIG. 4 represents the signal $I_L$-SIGN obtained when the current $I_L$ is compared with the reference zero. However, the current $I_L$ may delivered to the input of a Schmitt trigger 4 that has an internal reference slightly greater than 0 so as to obtain a signal $I_L$-SIGN slightly ahead in phase with respect to the current $I_L$. The particular combination of this signal $I_L$-SIGN with the switch-over decision signals $S_1$ and $S_2$ will make it possible to generate two control signals $T_1$ and $T_2$ for the switches $Q_1$ and $Q_2$.

More specifically, a first control signal $T_1$ is generated by fulfilling the logic AND function of the decision signal $S_1$ and of the signal $I_L$-SIGN. A first AND gate 5 with two inputs and one output connected to a power interface 6 is used for the generation of a control signal $T_1$ of this kind. Furthermore, a second control signal $T_2$ is generated by carrying out the logic AND function of the decision signal $S_2$ and a signal $\overline{I_L\text{-SIGN}}$ complementary to the signal $I_L$-SIGN obtained by means of an inverter gate 7, the shape of this complementary signal being shown in the curve 4e of FIG. 4. A second AND gate 8 followed by a power interface 9 is used for the generation of the signal $T_2$. The curves 4f and 4g respectively represent the control signals $T_1$ and $T_2$ obtained.

By comparing for example the decision signal $S_1$ and the effective control signal $T_1$ of the switch $Q_1$, it can be seen that the opening command (the passage from 1 to 0) of the switch $Q_1$ comes into operation as soon as the decision to open is taken. However, when the decision to close the switch $Q_1$ is taken (the passage from 0 to 1 of the signal $T_1$), the closing command $T_1$ comes into effective operation only when the current $I_L$ has changed its direction. A similar reasoning may be applied to the switch $Q_2$.

The four steps (1) to (4) of operation described here above are found again but the closing commands of the switches are governed by the direction of the current in the load.

The above assembly has the advantage of never stopping, even if there is a wrong command. Indeed, let it be assumed for example that the current $I_L$ is too weak. The switches are nevertheless closed as soon as a change in direction of the current is detected.

It can furthermore be shown that the voltage at the terminals of the switches is minimal or zero at the time of their closure. The stress on the components is therefore minimal.

An assembly of this kind furthermore is used for a speedier return to a stable state when the assembly is subjected to external disturbance.

The time taken to charge or discharge the snubber capacitors $C_1$ and $C_2$ may be far more variable here than in the case of idle time control.

Finally, the use of bipolar transistors to carry out the switching functions has no effect on the working of the control.

Here above, referring to FIGS. 3 and 4, we have seen a first embodiment of a device making use of active electronic circuits (namely inverter gates and AND gates). However, in certain cases, it is necessary to have available galvanic insulation that is not given by the device described here above.

Figure 5:
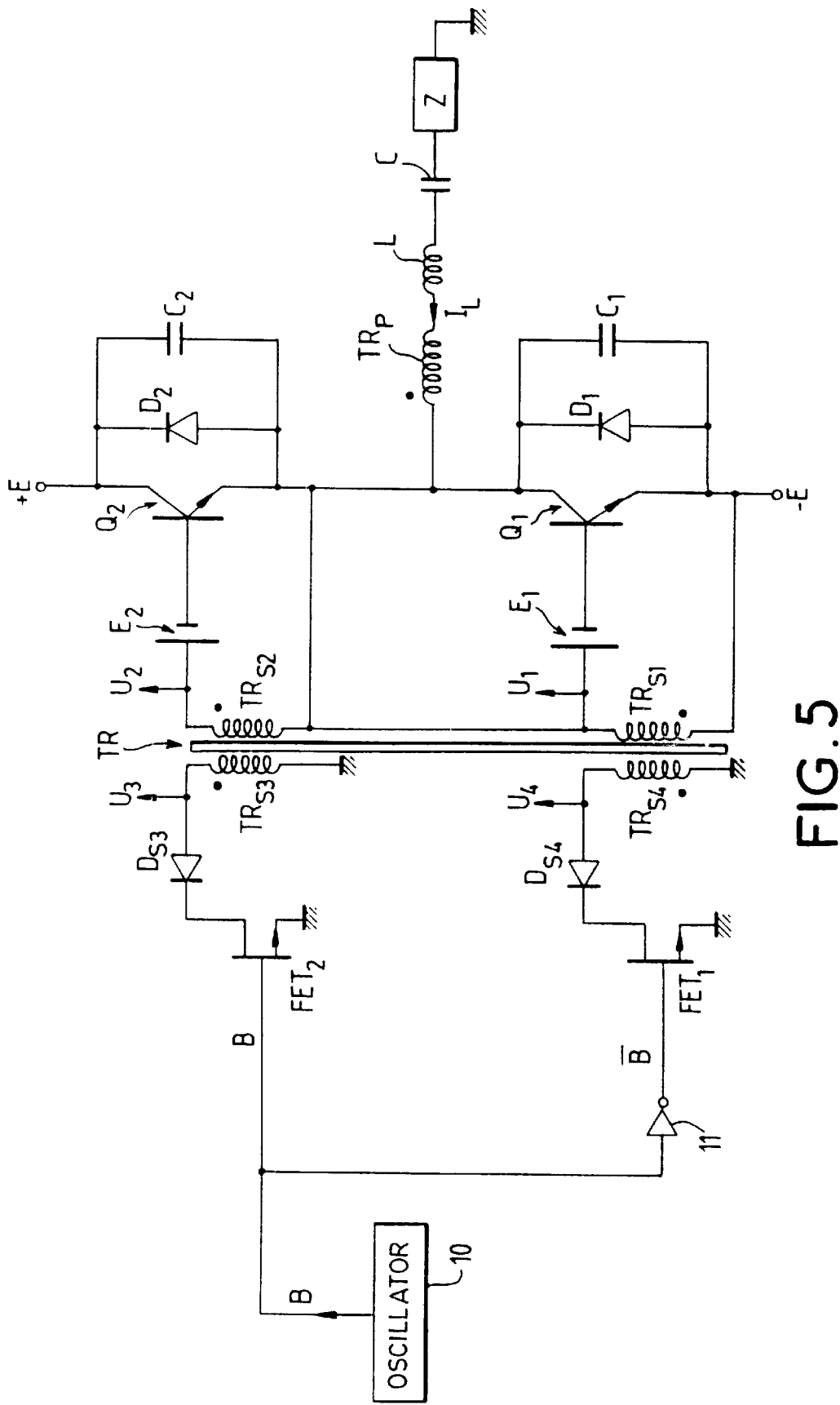
FIG. 5 illustrates a possible embodiment of a control device according to the invention.

A description shall now be given of a preferred embodiment of the device according to the invention, with reference to FIG. 5, wherein the AND functions are performed naturally without its being necessary to generate the signal $I_L$-SIGN or the control signals $T_1$ and $T_2$.

FIG. 5 again shows the basic ZVS structure described here above, the switches being formed by two NPN type bipolar transistors.

The control device according to the invention has a current transformer TR used for the production of the currents for the control of the base of the transistors $Q_1$ and $Q_2$. More specifically, a primary winding $TR_p$ of the transformer TR is series-connected between the load and the common junction point between the transistors $Q_1$, $Q_2$, the freewheeling rectifiers $D_1$, $D_2$ and the snubber capacitors $C_1$, $C_2$.

A first secondary winding $TR_{S1}$ of the transformer TR is connected between the emitter of the transistor $Q_1$ and the positive terminal of a first DC supply $E_1$, the negative terminal of which is connected to the base of the transistor $Q_1$.

Similarly, a second secondary winding $TR_{S2}$ of the transformer TR is connected between the emitter of the transistor $Q_2$ and a second DC supply $E_2$, the second terminal of which is connected to the base of the transistor $Q_2$.

On the other side of the core of the transformer TR, a third secondary winding $TR_{S3}$ is connected between the ground of the circuit and the anode of a rectifier $D_{S3}$. The cathode of the rectifier is connected to the source of a field-effect transistor $FET_2$ used as an electronic switch.

Similarly, a fourth secondary winding $TR_{S4}$ of the transformer TR is connected to the source of a field-effect transistor $FET_1$ by means of a rectifier $D_{S4}$.

The windings $TR_{S3}$ and $TR_{S4}$ are coupled respectively to the windings $TR_{S2}$ and $TR_{S1}$.

The biases of the different windings are indicated by the dots placed at the sides of the windings.

Hereinafter, the reference B shall be applied to the switchover decision signal of the switch $Q_2$ delivered for example by an oscillator 10. This signal B is delivered firstly to the gate of the transistor $FET_2$ and secondly, after reversal by an inverter gate 11, to the gate of the transistor $FET_1$.

The basic assumption here is that the current $I_L$ in the load is positive, namely that it goes from the load to the primary winding $TR_p$ as shown in FIG. 5, when the decision signal B is in the state 1.

Four stages of operation can then be distinguished:

(1) The electronic switch $FET_1$ is open and the electronic switch $FET_2$ is closed. Since the current $I_L$ is positive, the winding $TR_{S1}$ conducts a current in the base of $Q_1$. Consequently, the transistor $Q_1$ is conductive (switch closed). The voltages $U_1$ and $U_4$ respectively at the junction point between the winding $TR_{S1}$ and the supply $E_1$ and at the junction point between the winding $TR_{S4}$ and the rectifier $D_{S4}$ are positive. Conversely, the voltages $U_2$ and $U_3$ taken respectively at the junction point between the windings $TR_{S2}$ and the supply $E_2$ and the junction point between the rectifiers $D_{S3}$ are negative. Consequently, this rectifier $D_{S3}$ is off.

(2) The current $I_L$ is always positive and the signal B goes to 0. The switch $FET_2$ gets opened and the switch $FET_1$ gets closed. The voltages $U_4$ and $U_1$ get cancelled out and the switch $Q_1$ gets opened. The current $I_L$ furthermore causes the freewheeling rectifier $D_2$ to be conductive. The rectifier $D_{S4}$ and the switch $FET_1$ are conductive.

(3) The current $I_L$ gets cancelled out and becomes negative. The signal B is always at 0.

The winding $TR_{S2}$ conducts a current in the base of the transistor $Q_2$. The result thereof is that the switch $Q_2$ gets closed. The voltages $U_2$ and $U_3$ are then positive and the voltages $U_1$ and $U_4$ are negative and turn the rectifier $D_{S4}$ off.

(4) The current $I_L$ is always negative and the signal B goes to 1. The switch $FET_1$ gets closed and the switch $FET_2$ gets opened. The voltages $U_3$ and $U_2$ are zero and the switch $Q_2$ gets opened. The current $I_L$ then makes the freewheeling rectifier $D_1$ conductive. Furthermore, the rectifier $D_{S3}$ and the switch $FET_2$ become conductive.

After the phase (4), the cycles (1) to (4) are repeated.

According to the operation that has just been described, it can be seen that the switch $Q_1$ gets closed only if B is at 1 and if the current $I_L$ in the load is positive and that the switch $Q_2$ gets closed only if B is at 0 and the current $I_L$ is negative. By means of this second assembly using a current transformer TR, the logic AND function of the decision signal and of a signal representing the direction of the current in the load are therefore properly fulfilled. Furthermore, a slight phase advance is desirable in practice in order to have advance knowledge of the direction of the current, and this slight phase advance is quite naturally obtained by the magnetizing current in the transformer TR.

The transformer described here above is used to obtain galvanic insulation between, firstly, the controlled part comprising the load Z and the elements that are series-connected with this load, the transistors $Q_1$, $Q_2$, the rectifiers $D_1$, $D_2$ and the capacitors $C_1$, $C_2$ and secondly the controlled part comprising the oscillator 10, the switches $FET_1$, $FET_2$ and the rectifiers $D_{S3}$, $D_{S4}$.

The transformer described here above furthermore is used for an automatic supply of the base of the transistors $Q_1$, $Q_2$ without any supply of energy by an external supply.

Figure 1:
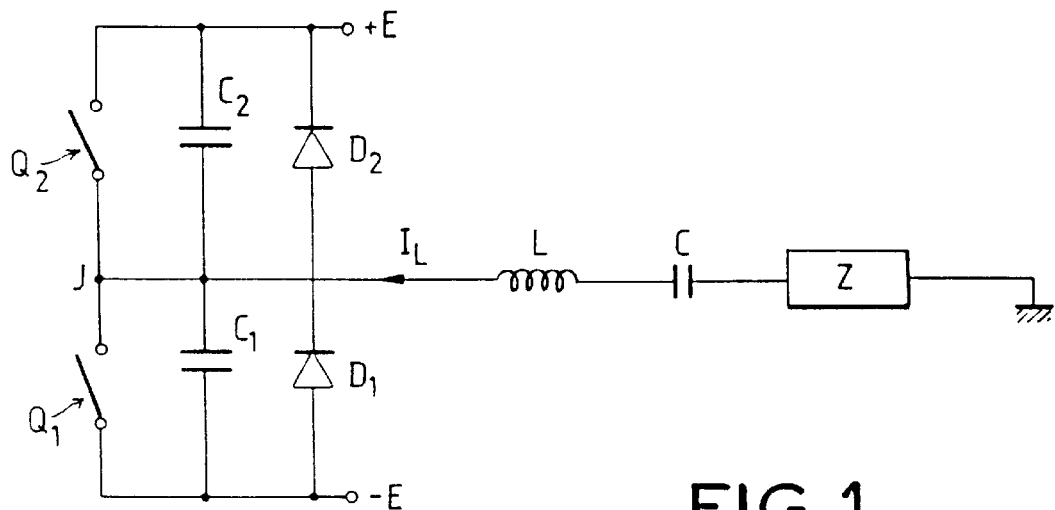
FIG. 1, which has already been described, shows the general electrical diagram of a half-bridge ZVS structure.
Figure 2:
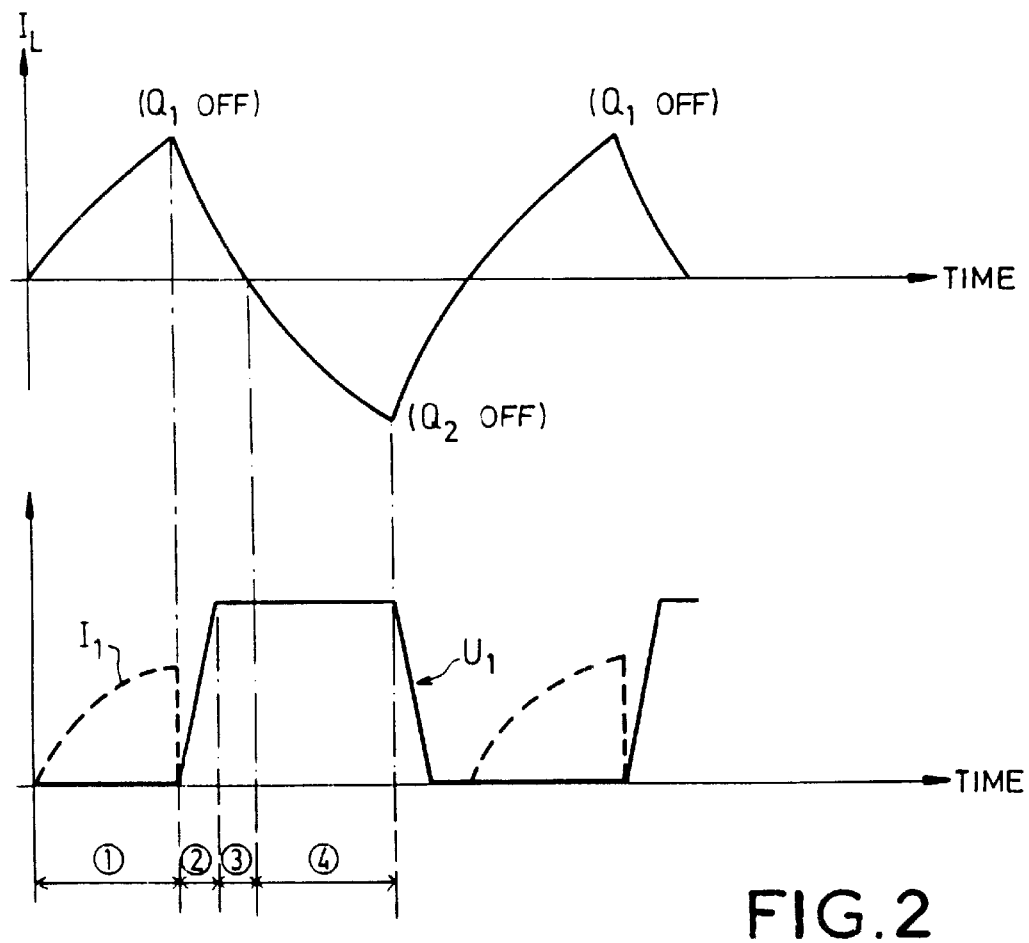
FIG. 2, which has already been described, shows the variations in time of the current in the load and of the current and voltage of one of the switches of the structure according to FIG. 1.

The control method that has just been described is of course applicable to any ZVS structure derived from the half-bridge structure shown in FIG. 1.

Figure 6:
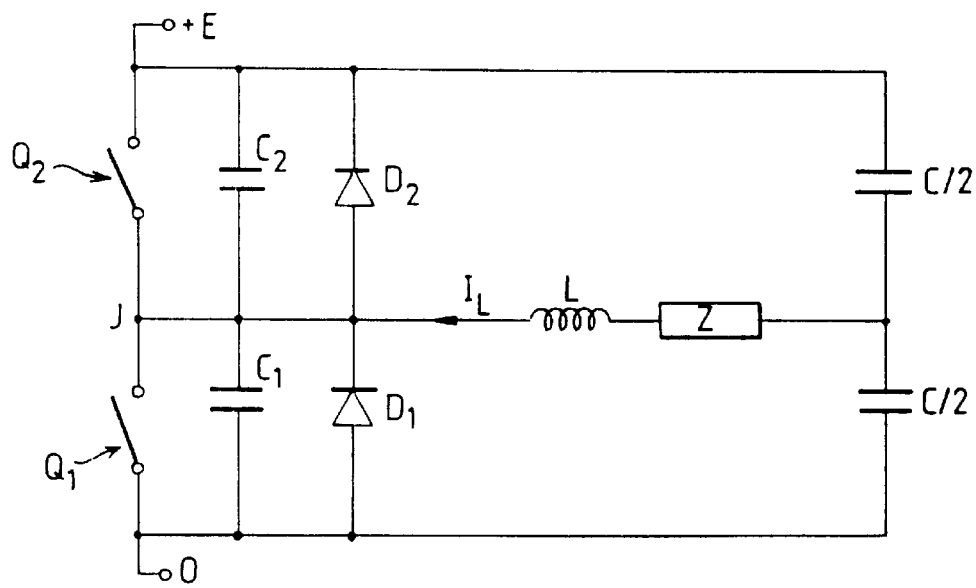
FIG. 6 shows the electrical diagram of a half-bridge ZVS structure with capacitive divider.

It is possible in particular to replace the symmetrical supply source (−E, 0, +E) by a simple source (0, +E) as can be seen in FIG. 6. In this case, the resonance capacitor C of FIG. 1 is replaced by two capacitors C/2 mounted as a capacitive divider.

The control method can furthermore be extended to a full-bridge ZVS structure comprising two pairs of transistors or to a ZVS structure comprising any numbers of pairs of transistors.

Figure 7:
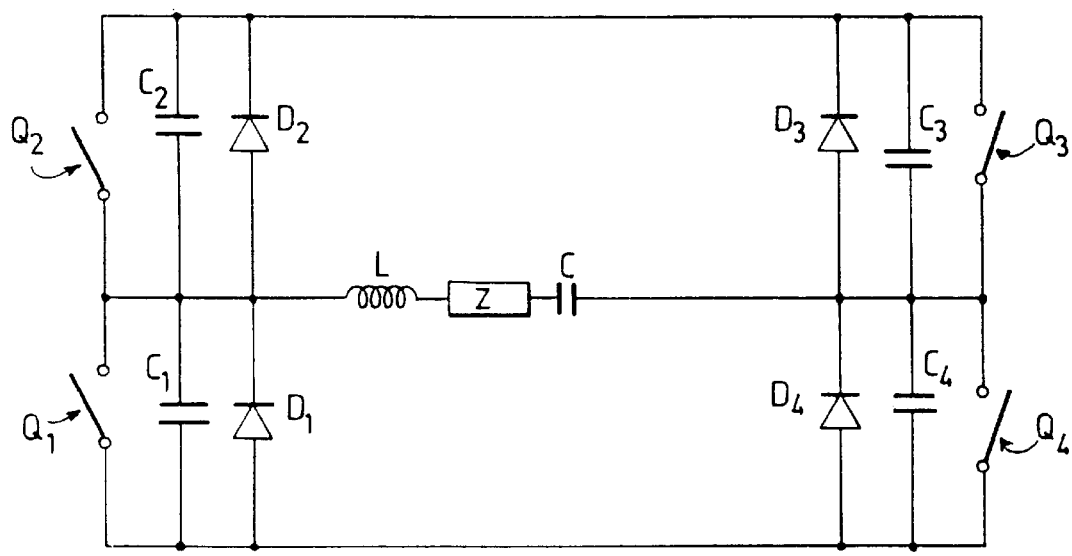
FIG. 7 shows the electrical diagram of a full-bridge ZVS structure.

FIG. 7 shows the electrical diagram of a full-bridge ZVS structure.

This Figure shows the pair of switches $Q_1$, $Q_2$ of the half-bridge structure associated with their snubber capacitor and their freewheeling rectifier, respectively $C_1$, $D_1$ and $C_2$, $D_2$. Furthermore, a second pair of switches $Q_3$, $Q_4$, which are also each associated with a freewheeling rectifier $D_3$, $D_4$ and with a snubber capacitor $C_3$, $C_4$, is mounted symmetrically with respect to the load in the same way as the first pair, between the DC supply terminals.

Here above, we have seen the commands to be generated for the switches $Q_1$ and $Q_2$ in accordance with the control method according to the invention. The extension of this method to the full-bridge structure of FIG. 7 consists of the generation of the same command for two switches taken in each of the two pairs located diagonally with respect to the load. Thus, the switches $Q_1$ and $Q_3$ will receive the same command. Similarly, the switches $Q_2$ and $Q_4$ will controlled by one and the same signal.

What is claimed is:

1. An apparatus with a device for controlling a circuit having a resonance inverter power supply for at least one load with an inductive component, comprising:

the inverter power supply having,
two switching transistors series-connected between terminals of a DC voltage supply so as to form two switches that are alternately conductive under an effect of the device for controlling,
two freewheeling rectifiers each parallel-connected to respective of the two transistors,
two snubber capacitors each parallel-connected to respective of the two transistors,
a common junction point between the two switching transistors, the freewheeling rectifiers and the capacitors being series-connected to a terminal of said load
the device for controlling comprising
first means delivering, for each switch, a two-state switch-over decision signal representing a decision to open or to close the switch, each switch-over decision signal being associated, by a power interface, with one of the two switches, the two switch-over decision signals being in phase opposition so as to decide a periodic opening and closing of each switch alternately,
means for detecting changes of direction of a current in the load;
a current transformer including,
a primary winding series-connected between the load and the common junction point between the switches, the freewheeling rectifiers and the snubber capacitors,
a first secondary winding connected between the emitter of one of the two switches and the first terminal of a first DC supply, the second supply terminal being connected to the base of the switch,
a second secondary winding connected between the emitter of the other switch and the first terminal of a second DC supply, the second supply terminal being connected to the base of the other switch,
a third secondary winding and a fourth secondary winding coupled respectively to the second and first secondary windings, the third and fourth secondary windings being each connected between a ground and one of the power interfaces, wherein biases of the different windings being chosen such that opening of at least one of the switches takes place as soon as the associated switch-over decision signal is in a state representing a decision to open, and such that closing of at least one of the switches takes place when the associated switch-over decision signal is in a state representing a decision to close, and substantially when the current in the load has changed direction.

2. A device according to claim 1, wherein the power interface comprises an electronic switch and a rectifier, said electronic switch being activated by one of the two switching decision signals.

3. A device according to claim 1, wherein the first means comprises an oscillator.

4. An apparatus with a device for controlling a circuit having a resonance inverter power supply for at least one load with an inductive component, comprising:

the inverter power supply having,
two switching transistors series-connected between terminals of a DC voltage supply so as to form two switches that are alternately conductive under an effect of the device for controlling,
two freewheeling rectifiers each parallel-connected to respective of the two transistor,
two snubber capacitors each parallel-connected to respective of the two transistors,
a common junction point between the two switching transistors, the freewheeling rectifiers and the capacitors being series-connected to a terminal of said load
the device for controlling comprising,
first means delivering, for each switch, a two-state switch-over decision signal representing a decision to open or to close the switch, each switch-over decision signal being associated, by a power interface, with one of the two switches, the two switch-over decision signals being in phase opposition so as to decide a periodic opening and closing of each switch alternately,
means for detecting changes of direction of a current in the load;
a current transformer including,
a primary winding series-connected between the load and the common junction point between the switches, the freewheeling rectifiers and the snubber capacitors,
a first secondary winding connected between the emitter of one of the two switches and the first terminal of a first DC supply, the second supply terminal being connected to the base of the switch,
a second secondary winding connected between the emitter of the other switch and the first terminal of a second DC supply, the second supply terminal being connected to the base of the other switch
a third secondary winding and a fourth secondary winding coupled respectively to the second and first secondary windings, the third and fourth secondary windings being each connected between a ground and one of the power interfaces, wherein biases of the different windings being chosen such that opening of at least one of the switches takes place as soon as the associated switch-over decision signal is in a state representing a decision to open,
wherein the closing of a switch takes place, when the associated switch-over decision signal is in the state representing the decision to close occurring at a slight phase advance with respect to when the current in the load changes direction.

* * * * *